Dec. 31, 1957
A. BUDNIK
2,818,280
COUPLING WITH CAM LOCKING MEANS
Filed April 21, 1955
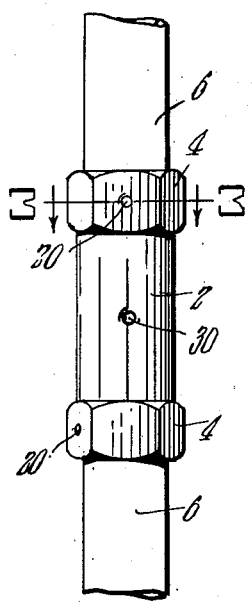
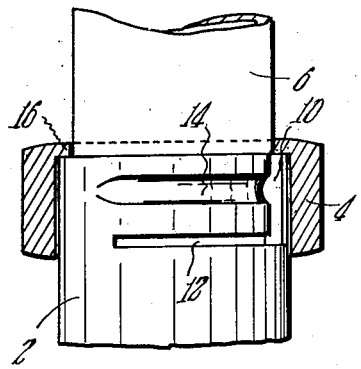
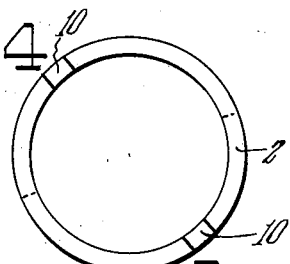
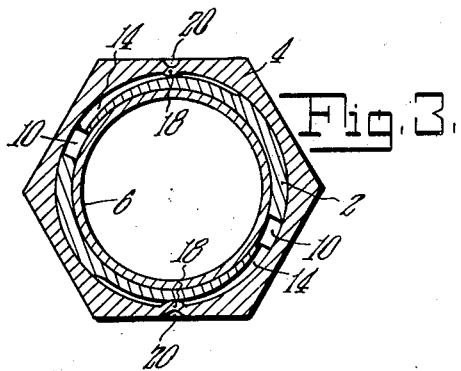
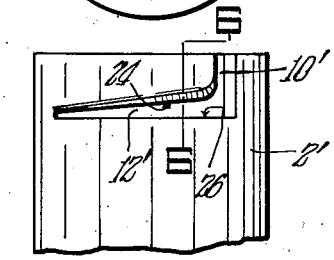
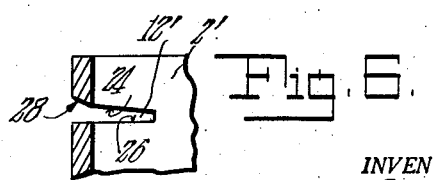
INVENTOR.
Aloysius Budnik.
BY
Ross Ross
atty & Agent.

United States Patent Office 2,818,280
Patented Dec. 31, 1957

2,818,280

COUPLING WITH CAM LOCKING MEANS

Aloysius Budnik, Northampton, Mass.

Application April 21, 1955, Serial No. 502,863

1 Claim. (Cl. 285—394)

This invention relates to coupling devices and is directed more particularly to devices for connecting adjacent ends of adjacent lengths of material.

While the novel coupling of the invention is adapted for coupling adjacent electrical conduits, it may be used in connection with pipes and tubing generally, as well as with rods or the like.

According to novel features of the invention, the coupling structure includes, in a general way, a barrel for receiving the ends of the members being coupled. Opposite ends of the barrel are provided with longitudinal and circumferential slots so as to form yieldably object-gripping portions which are actuated into object gripping relation by cam means as distinguished from screw means.

The construction is such that the ends of objects are easily and readily gripped in rigidly coupled relation.

All of the above objects, I accomplish by means of such structure and relative arrangements of parts thereof, as will fully appear by a perusal of the description below and by various specific features which will be hereinafter set forth.

To the above cited and other ends and with the foregoing and various other novel features and advantages and other objects of my invention as will become more readily apparent as the description proceeds, my invention consists in certain novel features of construction and in the combination and arrangement of parts as will be hereinafter more particularly pointed out in the claims hereunto annexed and more fully described and referred to in connection with the accompanying drawings wherein:

Fig. 1 is an elevational view of a coupling structure embodying the novel features of the invention;

Fig. 2 is an elevational view of one end of the barrel of the coupling device;

Fig. 3 is a sectional view on the line 3—3 of Fig. 1;

Fig. 4 is an end view of the barrel of the coupling device;

Fig. 5 is an elevational view of one end of the barrel of the coupling device to illustrate a modified form of the invention; and Fig. 6 is a sectional view on the line 6—6 of Fig. 5.

Referring now to the drawings more in detail, the invention will be fully described.

In general, the coupling device includes a central tubular barrel 2 and cam members 4 at opposite ends thereof.

The barrel 2 is tubular in form having an inner diameter to slidably receive end portions of objects 6 which are to be coupled together and which may comprise lengths of conduit, tubing, piping or the like.

The barrel and cam members may be formed from various material and metals as may be desired depending upon the manner of use of the coupling.

Opposite ends of the barrel 2 are similar in form and, as in Figs. 2 to 5 inclusive, are provided with longitudinal entrance slots 10. There may be any desired number of such slots depending upon the diameter of the barrel and the material from which it is formed.

Circumferential slots 12 extend from the slots 10, as in Fig. 2, and these may be of any desired circumferential length. The slotted arrangement provides end portions of the barrel which are yieldable and adapted to be contracted about and to grip an object within the barrel 2.

Adjacent the ends of the barrel and extending circumferentially from the slots 10, there are cam grooves 14 which gradually decrease in depth from the said slots 10.

The cam members 4 are adapted for turning on the opposite ends of the barrel 2 and have rims 16 engageable with the ends of said barrel.

The cams are slipped onto the ends of the barrel for rotation relative to and are provided with keys 18. Said keys in one way are formed by displacing portions of the sides of the barrel inwardly as at 20. As the cams are slipped onto the barrel, the keys pass along the entrance slots 10.

With the cams on the barrel and the objects in the barrel to be coupled, the cams are turned on the barrel ends so that the keys 18 traverse the grooves 14. The action is such that the yieldable end portions of the barrel are contracted or pressed inwardly to grip or bite the object in a firm and secure manner.

Thus, end portions of adjacent sections of conduit or the like are easily and readily coupled together by turning the cams on the ends of the barrel.

According to the form of the invention shown in Fig. 5, longitudinal entrance slots 10' are provided in the ends of the barrel 2' which are similar to the slots already described. Circumferential slots 12' extend from the slots 10' and the said slots, as in the former case, provide portions of the barrel which are yieldable inwardly.

The upper sides 24 of the slots 12' and lower sides 26 thereof relatively converge from the slots 10 and said upper sides 24 are preferably inclined to some extent, as indicated by 28 in Fig. 6.

The cam members are such that, as they are turned on the barrel ends, the keys thereof ride on the edges of the slots 12' and press the yieldable portions of the barrel ends inwardly for gripping an object in the coupling.

The barrel 2 is provided with one or more inwardly displaced portions indicated by 30 and disposed substantially equidistant from opposite ends thereof. This is to provide stop means within the barrel for abutment by objects within the barrel.

It will be observed that the keys of the cam members operate so that they act with increasing force as the said members are turned for clamping purposes. The groove 14 and slot 12' are so arranged for this purpose that force is applied to the yieldable portions of the barrel more or less gradually, at least not abrutply, and for this reason, great force is applied and the cam members remain in clamping positions and are not likely to be accidently displaced.

The construction is to be distinguished from arrangements involving screw threads which require several turns for clamping. According to this invention, much less than a complete turn of the cam members is required for the clamping and the degree of clamping action increases from zero to maximum.

For the best gripping function, the barrel 2 is so formed or machined that the end edges thereof and/or the edges of the slots are burred, sharpened or roughened for biting into the objects being coupled.

The invention may be embodied in other specific forms without departing from the essential characteristics thereof. Hence, the present embodiments are therefore to be considered in all respects merely as being illustrative and not as being restrictive, the scope of the invention being indicated by the appended claims rather than by the foregoing description, and all modifications and variations as fall within the meaning and purview and range of equivalency of the appended claims are therefore intended to be embraced therein.

What it is desired to claim and secure by Letters Patent of the United States is:

A coupling device of the character described comprising in combination, an elongated barrel and an elongated cam member, said barrel being tubular in form for receiving an end portion of a cylindrical member and provided on opposite sides at one end and through the wall thereof with axial entrance slots extending inwardly from the extremity of said end and terminating at their lower ends in circumferential slots provided through said wall and extending in corresponding directions through parts of the circumference of said barrel providing end portions of the barrel outwardly of said slots which are yieldable inwardly to bear against a member in said bore, said end portions intermediate said slots and extremity of said barrel provided with cam grooves extending from said entrance slots circumferentially of said barrel in the same direction as said slots and gradually decreasing in depth from said entrance slots, said cam member provided with an outer axial bore for turning on a member in the bore of the barrel and an inner bore of relatively larger diameter for sliding onto and turning on the end portion of said barrel, said bores forming an inwardly extending rim at the outer end of said inner bore, said cam member having portions thereof displaced inwardly on opposite sides providing projections on said inner bore adapted to slide along said entrance slots as the cam member slides onto the end portion of the barrel, said projections and rim being axially spaced whereby with the rim engaged with the extremity of the barrel said projections are disposed to register with and enter the grooves of the barrel as the cam member is turned thereon to depress the yieldable end portions of the cam member inwardly against a member in the barrel bore.

References Cited in the file of this patent

UNITED STATES PATENTS

| 37,721 | Jucket | Feb. 17, 1863 |
| 729,506 | McMurtrie | May 26, 1903 |
| 1,101,963 | Rosenfeld | June 30, 1914 |
| 1,174,288 | Rosenfeld | Mar. 7, 1916 |
| 1,202,196 | Lewis | Oct. 24, 1916 |
| 1,224,269 | Broadbent | May 1, 1917 |
| 1,700,195 | Cox | Jan. 29, 1929 |

FOREIGN PATENTS

| 26,678 | Great Britain | 1906 |